3,248,264
SUGAR PURIFICATION PROCESS
William Arthur Welch, Ardmore, Pa., assignor to Carus Chemical Company, Inc., La Salle, Ill., a corporation of Illinois
No Drawing. Filed Nov. 26, 1963, Ser. No. 326,269
7 Claims. (Cl. 127—50)

This invention relates to the purification of sugar, and particularly to a new process therefor utilizing potassium permanganate as an active reagent for decolorizing and conditioning sugar liquor prior to crystallization.

Virtually all refined sucrose is manufactured on a commercial scale from either sugarcane (cane sugar) or sugarbeets (beet sugar).

In a process which has heretofore been used in the manufacture of sugar, raw cane juice is clarified with lime, which coagulates and precipitates certain impurities. Often, phosphoric acid is added as an adjunct to the lime in clarifying the raw cane juices. The impurities are separated from the particularly purified solution, typically by filtration. The clarified raw cane sugar liquors thereby obtained are then defecated. Lime is added, forming a flocculent precipitate which entangles the remaining suspended matter and colloids. The solid impurities are then separated from the cane sugar liquors, and the resulting solution decolorized by contacting it with bone char or activated carbon. After decolorization, the pure cane sugar is crystallized. In some processes using activated carbon, the later is slurried with the sugar solution, and the carbon and impurities are removed by filtration.

A substantial defect of the processes heretofore used lies in the decolorizing step wherein bone char rapidly loses its decolorizing capacity, and must be revivified. Revivification is accomplished by first washing the adsorbent carbon free of sugar, and then removing it and roasting it at 900 to 2000° F.

It is an object of the present invention to provide a new process utilizing potassium permanganate as an active agent, adaptable to be used in the manufacture of refined sucrose.

Another object of the present invention is to provide a process, utilizing potassium permanganate as an active agent, which process is adaptable to be utilized in the defecation of raw cane sugar.

Yet another object of the present invention is to provide a process, utilizing potassium permanganate as an active agent, which process is adaptable to be used in conjunction with existing sugar defecation processes.

Still another object is to provide a process, utilizing potassium permanganate as an active agent, for removal of soluble ash such as iron from sugar solutions by oxidizing such ash to an insoluble form.

Another object is to provide a process of the aforesaid character, utilizing potassium permanganate as an active agent for oxidizing and degrading resins, gums and organic colloids to obtain a more filterable liquor.

Another object is to provide a new process, utilizing potassium permanganate as an active agent, adaptable to be used in conjunction with carbon adsorption treatments, whereby the active life of the adsorbent carbon is prolonged significantly.

A further object is to provide a process, utilizing potassium permanganate as an active agent, adaptable to be used for revivification of adsorbent carbon from sugar defecation treatments.

A still further object is to provide a process, utilizing potassium permanganate as an active agent, which process is adaptable to be utilized to revivify adsorbent carbon.

Another object is to provide a process, utilizing potassium permanganate as an active agent, which process may be used in the purification of raw sugar cane juices and beet sugar, as well as the treatment of raw cane sugar.

Still another object is to provide a process of the character hereinbefore described, adapted to be utilized in continuous sugar purification systems as well as in the more common batch treatment systems.

These and other objects and advantages of the present invention will be apparent from the following description. Broadly described, the present invention is a process wherein small amounts of dilute aqueous potassium permanganate solution rapidly oxidatively degrades sugar impurities, forming in the process manganese dioxide precipitate, without significant adverse effect upon the sucrose component. The manganese dioxide is then physically removed. The treatment with dilute potassium permanganate solution is of general utility in the purification of sugar. For example, the raw cane juices may be directly clarified with dilute permanganate, alone or in conjunction with other treatments such as liming, carbonation, phosphatation, and sulfitation. Or, previously clarified raw cane sugar may be decolorized with dilute permanganate solution, again acting either alone or as an adjunct to other treatments. It is also possible to revivify adsorbent carbon material, used in the decolorization of raw cane sugar, with small amounts of dilute permanganate solution.

In all cases, however, the dilute permanganate treatment is substantially the same. Rapid oxidative degradation of sugar impurities is followed by physical removal of the manganese dioxide formed. Thus, it is possible to initially separate decolorizing impurities by bone char or adsorbent carbon filtration according to the presently prevalent method. The impurities may then be removed from the absorbent carbon or bone char by treating it with the dilute permanganate solution, thereby revivifying the carbon. The destruction of the sugar impurities is the same whether it occurs in the sugar liquor itself, or in the adsorbent carbon filter.

One preferred use of the present novel potassium permanganate process is in the defecation of clarified raw cane sugar liquors with dilute permanganate to render the liquors substantially colorless. The decolorizing action of the permanganate is extremely rapid, the cane sugar liquors being rendered substantially colorless, except for the manganese dioxide formed, in a few seconds. It is remarkable and unexpected that the use of the permanagnate results in such rapid selective degradation of the colored impurities, and yet has no deleterious effect on the molecules of sugar. It is further surprising that the decolorization can be accomplished using only extremely small amounts of permanganate.

Raw sugar liquors may be quickly decolorized by the addition of an unexpectedly small amount of dilute potassium permanganate solution directly to the heated liquors, with rapid agitation. The discoloring material is oxidized within a few seconds, manganese dioxide being formed in the process. It is preferred that the potassium permanganate be added in approximately 1% water solution, but the strength of the solution is not critical. Substantially any strength permanganate solution may be used so long as undesirable dilution of the sugar liquors does not result.

The amount of potassium permanganate added determines the effectiveness of the defecation process. Above and below an optimum level (about 0.07% potassium permanganate, based on the weight of raw sugar solids) the effectiveness diminishes. Substantial color reduction (about 60% reduction or better) is still obtained within the preferred dosage range of about 0.04% potassium permanganate to about 0.17% potassium permanganate. Better results are obtained with the potassium permanganate level ranging between about 0.07% and 0.11% potassium permanganate, with 0.07% potassium permanganate being the most desirable dosage.

The pH of the dilute aqueous potassium permanganate solution is not critical. The process is operable irrespective of whether the solution is acidic, basic, or neutral. Thus, the risk of producing invert sugar with potassium permanganate is minimized.

The temperature of the permanganate treatment is not critical, and may be substantially any temperature at which it is convenient to handle the raw sugar liquors, e.g., in the range of 15° C. to 95° C. It is preferred to carry the treatment out at about 85° C.±5° C. because the liquor viscosities are lower at the higher temperatures.

Following the addition of the potassium permanganate, and after the formation of manganese dioxide, the manganese dioxide is removed. For example, the permanganate treated solution may be passed through a filter. Alternatively, the treated sugar liquors may be passed through adsorbent carbon, such as activated carbon or bone char, which function as a straining medium. When lime or phosphoric acid are used in defecation, the manganese dioxide is removed by occlusion in the sludge and helps to form a more cohesive sludge which is easily separated from the sugar liquor. The sludge, for example, can be removed by air blowing it to the liquor surface from which it is skimmed.

The present invention also provides a novel method for in place revivification of adsorbent carbon materials, such as bone char and activated carbon. The adsorbent carbon is washed or soaked with small amounts of dilute potassium permanganate solution. The permanganate oxidizes the adsorbed impurities, and in the oxidized form they consist of altered molecules so degraded that they are no longer amenable to adsorption. The dilute potassium permanganate is added to the adsorbent carbon in amounts sufficient that the characteristic pink color of the dilute permanganate solution persists. There is no critical amount of permanganate solution that must be added to a given weight of carbon. The permanganate demand in all cases depends on the amount and type of impurities adsorbed on the carbon. Hence, it is necessary to add the solution until the pink color is obtained, indicating that potassium permanganate has been added in excess of the amount needed to oxidize all the impurities. Neither is there a critical concentration for the permanganate solution, any dilute solution being operative, e.g., 0.01 to 2% strength. A preferred concentration is about 0.1–1% potassium permanganate.

The degraded impurities, no longer amenable to adsorption, may be washed from the adsorbent carbon with water, excess potassium permanganate at the same time being removed. It is preferred to wash with water until the washings thereby obtained are substantially neutral.

During the oxidation, manganese dioxide is formed on the carbon. It is necessary to remove the manganese dioxide to complete the regeneration of the adsorbent carbon. This may be accomplished by using dilute sulfurous acid or sodium bisulfite solution. The acid or bisulfite, in a solution of convenient concentration, is passed through the adsorbent carbon in sufficient quantity to solubilize substantially all the manganese dioxide precipitate. It is convenient to use solutions with strengths of about a few percent, e.g., 0.5% to 5% preferably about 1%±0.4%. The carbon is then again washed with water, preferably until the washings are substantially neutral, to complete the revivification of the carbon.

Use of the novel potassium permanganate treatment permits simple, in place, revivification of adsorbent carbon, such as bone char and activated carbon. It is not necessary to remove the carbon and reactivate it by heating as has heretofore been done. Instead, the carbon may be restored to its full adsorbency by the aforedescribed process of treating it with dilute permanganate solution followed by dilute sodium sulfite solution or sulfurous acid solution, interspaced with water washes.

The dilute potassium permanganate treatment, herein disclosed, is generally useful in the purification of sugar. Its use is not restricted to decolorization of raw cane sugar, or revivification of adsorbent carbon filters. It is also contemplated that the dilute permanganate treatment may be used in the purification of raw cane juice, and beet sugar, as well as cane sugar. The permanganate treatment may be used in conjunction with other processes such as sulfitation, carbonation, phosphatation, and liming, continuously or in batches. Dilute permanganate is useful in removing impurities such as albumenoids, protein bodies, waxes and inorganic ash as well as decolorizing impurities.

As an example, the presently used phosphoric acid-lime treatment is greatly improved when dilute aqueous potassium permanganate solution is added. The phosphoric acid and the lime, as a slurry, are added essentially simultaneously to sugar liquors, thereby producing a precipitate that separates sharply from the sugar solution. The potassium permanganate may separately be added to the sugar liquors, or it may be dissolved in either the phosphoric acid or the lime slurry. Substantial amounts of impurities are occluded in the precipitate, which floats or is air blown to the surface of the mixture. The potassium permanganate decolorizes and purifies beyond the point reached by lime and phosphoric acid alone. Furthermore, the manganese dioxide formed produces a better, more cohesive floc, allowing easier skimming of the floating impurities, thereby yielding a highly clarified solution.

Preferred embodiments of the presently disclosed invention, are shown hereinafter by way of example, but the invention is not limited thereto.

*Example I*

Fifteen milliliters of 1% potassium permanganate solution were added, with agitation, to 250 milliliters of washed raw cane sugar (332 grams of 66° Brix liquor) at about 85° C. The dosage corresponded to about 0.07% potassium permanganate, based on the weight of sugar. The resulting mixture was then filtered through activated carbon (1½% Nuchar C–190) to remove the manganese dioxide formed. The approximate color reduction was 80%.

*Example II*

A glass burette type column was filled with about 63 milliliters of bone char, saturated with impurities from raw cane sugar defecation. The bone char was treated with 0.1% potassium permanganate solution until a pink color broke through. Two hundred fifty milliliters of permanganate solution was added, amounting to a potassium permanganate demand of 250 milligrams. The column was then washed with water to a pH of about 6.8, in order to displace the excess of potassium permanganate.

This example is illustrative of the method of revivifying spent adsorbent carbon, according to the present novel process in which potassium permanganate is utilized as an active agent.

*Example III*

A char column was treated with 0.1% potassium permanganate solution as in Example II. In order to solubilize the manganese dioxide precipitated on the bone char column, it was flushed slowly, following the water wash, with 250 milliliters of a solution containing 325 milligrams of sodium bisulfite. The column was then washed with distilled water to a pH of 6.9.

This example further illustrates the novel revivification process, in particular regard to the removal of manganese dioxide, formed during the permanganate oxidation, from the adsorbent carbon column.

*Example IV*

In a continuous pipe line defeaction system, lime as lime saccharate, with potassium permanganate dissolved therein in an effective amount of approximately 0.07%, based on the weight of sugar, is added to raw cane sugar liquor. 75% phosphoric acid is also added, essentially simultaneously to the lime-permanganate addition. The liquors are pumped about 20 feet vertically and about 40 feet horizontally, and are then aerated, and decolorized by passing them through a bed of activated carbon or bone char.

*Example V*

A 5% phosphoric acid solution is added to washed raw sugar liquor in an effective amount of approximately 0.004% $P_2O_5$, based on the total weight of solids. A 15% lime slurry, with potassium permanganate dissolved therein in an effective amount of about 0.07%, based on the weight of sugar to be treated, is next added to the phosphate treated sugar solution. The precipitate formed is air blown to the surface, carrying with it occluded sugar impurities. The precipitate is then skimmed from the surface of the liquor, and the resulting clarified solution decolorized with activated carbon or bone char.

Examples IV and V illustrate the present novel process as it is adapted for use in conjunction with existing sugar purification processes. In particular, the examples show continuous and batch phosphate-lime treatments utilizing potassium permanganate as an adjunct. In both cases the use of the permanganate produces a clarified solution of superior quality, permitting a greater degree of decolorization by the adsorbent carbon, and, at the same time, prolonging the effective life of the adsorbent carbon.

The present invention, utilizing potassium permanganate as an active agent, provides a process adaptable to be used in the conversion of raw sugar cane juices into purified cane sugar. The process is also adaptable for use in clarifying and defecating raw cane sugar liquors. The process further is adaptable for use in revivifying activated carbon and bone char filters which are saturated with impurities from the decolorization of cane sugar liquors.

Unless otherwise specified, the percent amounts heretofore stated are expressed as percent by weight.

The invention is hereby claimed as follows:

1. An improvement in the prosphoric acid-lime process for purifying sugar liquors, which improvement comprises adding a dilute aqueous potassium permanganate solution along with phosphoric acid and lime to said sugar liquors, said dilute aqueous potassium permanganate solution being added in such amount that about 0.05% to about 0.17% potassium permanganate, by weight of the sugar, is added, the addition of said dilute aqueous potassium permanganate solution resulting in the degradation of oxidizable impurities in said sugar liquors and the formation of insoluble manganese dioxide, and thereby forming a precipitate from said lime and said phosphoric acid, in which precipitate are occluded said maganese dioxide and impurities of said sugar liquors, said occluded manganese dioxide improving the cohesivity of said precipitate.

2. A process as claimed in claim 1 wherein said sugar solution initially contains soluble ash, which is oxidized by said potassium permanganate to an insoluble form.

3. A process as claimed in claim 1 wherein said sugar solution initially contains at least one impurity selected from the group consisting of resins, gums and organic colloids, which are oxidized and degraded by said potassium permanganate.

4. A process as claimed in claim 1, bringing said precipitate to the surface of said liquor, and skimming the precipitate from said surface.

5. A process as claimed in claim 4 wherein said liquor is air blown to bring said precipitate to said surface.

6. A process as claimed in claim 4, and then decolorizing said sugar liquors with adsorbent carbon.

7. In a process for purifying raw cane sugar liquor by continuous lime-phosphate treatment process in a continuous flow, pipe line defecation system wherein lime and phosphoric acid are added continuously to said liquor and form a precipitate in the flowing liquor, the improvement comprising also continuously adding to said liquor flowing in said system a small amount equivalent to about 0.05 to about 0.17% by weight of potassium permanganate, based on the weight of the cane sugar in said liquor, flowing the resultant mixture through said pipe line system while said potassium permanganate degrades oxidizable impurities in said liquor with the formation of a precipitate of said lime and phosphoric acid together with occluded, insoluble maganese dioxide and occluded impurities present in said liquor, the cohesivity of said precipitate being improved by the occluded manganese dioxide, and separating said precipitate from said liquor.

References Cited by the Examiner

UNITED STATES PATENTS

| | | | |
|---|---|---|---|
| 47,308 | 4/1865 | Jasper | 210—32 |
| 83,974 | 11/1868 | Knaggs | 127—48 |
| 276,843 | 5/1883 | MacEachran | 127—48 |
| 1,866,417 | 7/1932 | Mackert | 210—32 |
| 2,216,753 | 10/1940 | Sanchez et al. | 127—48 |
| 2,381,090 | 8/1945 | Vincent | 127—46 |
| 2,470,332 | 5/1949 | Bollaert et al. | 127—51 X |
| 2,495,334 | 1/1950 | Lalande | 127—46 |
| 3,097,970 | 7/1963 | Delfin | 127—48 |

FOREIGN PATENTS 1,623   6/1866   Great Britain.

OTHER REFERENCES

Honig: Principles of Sugar Technology, 1953, Elsevier Pub. Co., New York, pp. 410–413 and 430 relied on.

Maumene: Epuration des Sucres et des Alcools, Journal des Fabricants de Sucre, 1894, No. 51, one page.

Spencer-Meade: Cane Sugar Handbook, eighth edition, 1945, John Wiley & Sons, New York, pp. 295–297 relied on.

MORRIS O. WOLK, *Primary Examiner*.